UNITED STATES PATENT OFFICE.

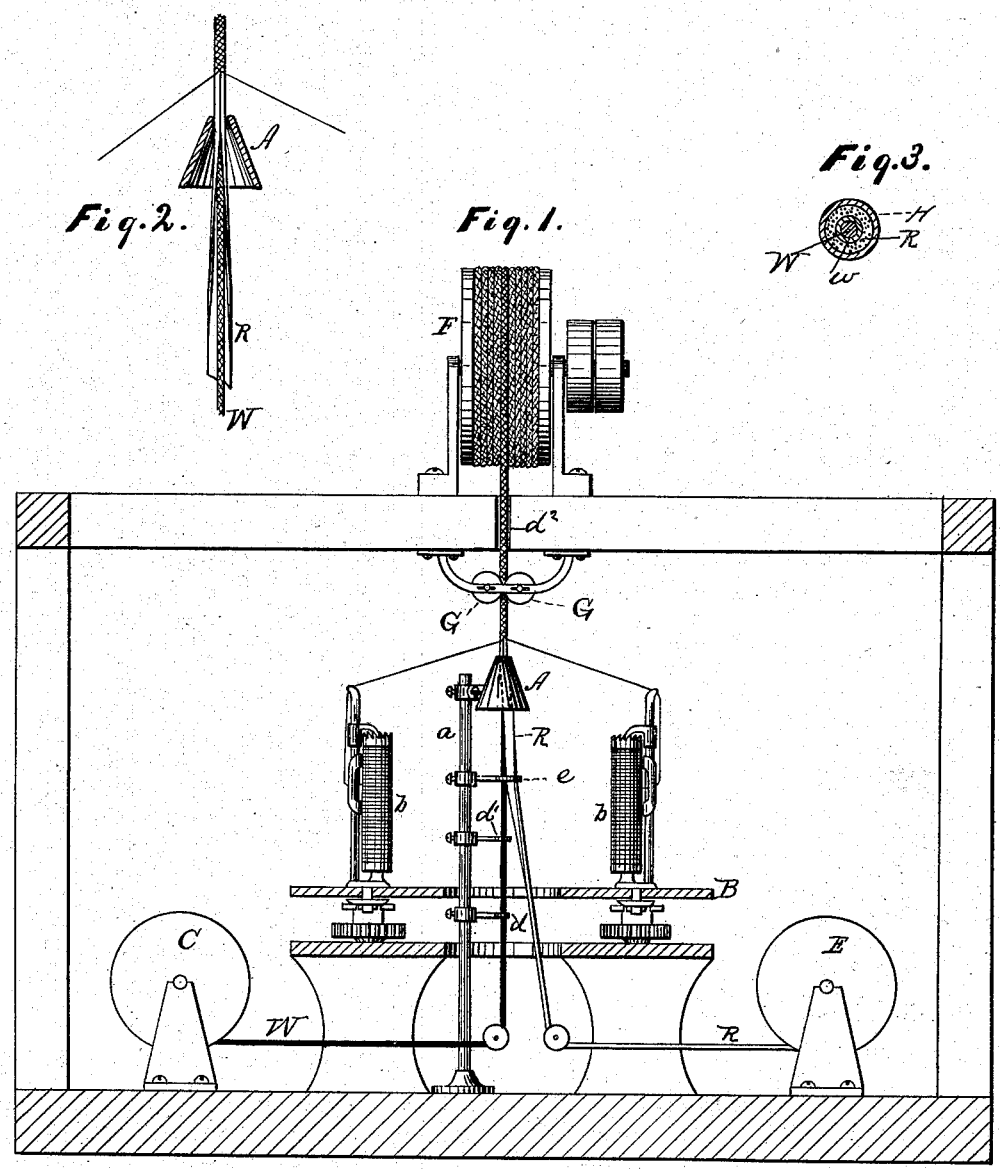

WILLIAM H. SAWYER, OF PROVIDENCE, RHODE ISLAND, ASSIGNOR TO EUGENE F. PHILLIPS, OF SAME PLACE.

INSULATED ELECTRICAL CONDUCTOR.

SPECIFICATION forming part of Letters Patent No. 252,261, dated January 10, 1882.

Application filed August 17, 1881. (No model.)

*To all whom it may concern:*

Be it known that I, WILLIAM H. SAWYER, a citizen of the United States of America, residing at Providence, in the county of Providence and State of Rhode Island, have invented certain new and useful Improvements in Insulated Electrical Conductors; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to that class of electrical conducting-wires which are covered with sheet india-rubber; and its object is to facilitate the application of the rubber covering to said wires and to provide them simultaneously with an outer fibrous protecting-covering.

In the accompanying drawings, Figure 1 represents in section so much of the braiding-machine as is necessary for illustration, and shows in elevation the devices used for applying the rubber covering to a naked wire. Fig. 2 is a longitudinal central section of the guide which lays the rubber strip about the wire, a previously-covered wire being shown as passing through the guide with a rubber strip. Fig. 3 is an enlarged cross-section of the complete conductor having a cotton-covered wire at its center.

The folding-guide A is mounted upon a standard, $a$, and is funnel-shaped, its center being coincident with the center of the braiding-machine wheel B, which carries the bobbins $b$, by means of which a braided fibrous covering is applied to the wire outside of the rubber covering.

The letter C indicates a reel which supplies the wire to be covered. $d$ is a guide for insuring the passage of the wire directly through the center of the braiding-machine wheel. $d'$ is a guide through which the wire passes to the center of the funnel, and $d^2$ is another guide, through which the wire passes, and is directed to a take-up reel, F, after it leaves the funnel or folding-guide and has received its outer braided covering.

The letter E designates a reel, upon which an unvulcanized rubber strip is wound for delivery, and $e$ is a guide over which the strip, as shown at R, passes to the folding-guide. This reel may be provided with any suitable devices to cause it to deliver the strip steadily and under proper tension.

The wire W may or may not be covered with cotton or similar insulating material before the rubber covering is applied.

The operation of the apparatus as now described, and with which my invention may be conveniently put in practice, is as follows: The wire W is first drawn through the center of the wheel B from the guide $d$, and then from the guide $d^2$ to the funnel. The rubber strip R is then led from its reel over the guide $e$, placed in contact with the wire by hand and folded around it at its tip, the wire and strip being then passed through the large end of the folding-guide to and out through the aperture at the small end of the guide, through the guide $d^2$, and thence to the reel F, to which it is secured. The rubber strip is of such width as to completely enfold the wire and have its edges slightly lap where they meet, and the aperture at the small end of the folding-guide is of such diameter to permit the wire folded in the rubber to pass snugly through. The flare of the funnel-shaped folding-guide is such that the rubber strip as it passes over its inner surface is gradually curved into a tubular form until its edges meet and slightly lap as the strip passes through the aperture at the small end of the folding-guide and envelops the wire. After the wire, with its initial rubber covering, is attached to the take-up reel the threads from the bobbins of the braiding-machine are secured to the wire at a point a little beyond the folding-guide. The take up reel being then rotated at a proper speed and the braiding-machine put into operation, the wire and rubber strip will be drawn from their respective reels, the strip folded snugly upon the wire by the folding-guide, and a braided outer covering applied by the braiding-machine as it emerges from the folding-guide.

For the covering-strip I may use any soft, pliable, and adhesive insulating material—such as unvulcanized india-rubber formed into a strip of suitable width and thickness—my object in using a material of this character being to insure close adherence together of the lapping edges of the strip and to permit the partial embedding of the outer braided covering in said strip. I lastly pass the rubber covered and braided wire between compression-rollers G G, the peripheries of which are grooved so that they will fully embrace the wires, and the bearings of the said rollers are adjustable, so that said rollers may be caused to exert any desired compression upon the wire, this compression having the effect of causing the edges of the rubber strip to adhere firmly together and to partially embed the braided covering in the unvulcanized surface of the rubber, so that even should the threads become broken they will not ravel off. The braided covering enables the wire to be wound safely upon a reel or laid in contact with any surface in any kind of weather without danger of adherence.

In cross-section, Fig. 3, the letter H designates the outer braided covering, R the rubber covering, and W the wire, shown in the present instance as surrounded immediately by a covering of fibrous insulating material, w, which may or may not be used, but which I prefer to use, as the direct contact of the metallic surface of the wire and the rubber is more or less deleterious to both.

I do not confine myself to any particular apparatus for carrying out my invention, but that described and shown will be found quite efficient.

I am aware that wires and strips of rubber have been passed through funnel-shaped guides and grooved rollers to place the rubber around the wire; and I am also aware that rubber-covered wires have been provided with braided outer fibrous coverings, and that foil-covered wires have had a fibrous covering braided on as the wire emerged from the apparatus which applied the foil, and I lay no claim to any of these inventions.

Having now described my invention, what I claim is—

1. The herein-described continuous method of providing wire with an insulating covering and an outer protecting-covering of fibrous material, the same consisting in covering the wire with a longitudinal strip of soft, pliable, adhesive insulating material, with its edges in contact with each other, superimposing a fibrous covering upon said insulating material and subjecting the wire thus covered to pressure, whereby the edges of the insulating material are caused to become firmly united, and the fibrous outer covering is partially embedded in said soft adhesive insulating material.

2. The herein-described continuous method of preparing rubber-covered wire and providing the same with an outer protecting-covering of fibrous material, the same consisting in passing a suitable wire and an unvulcanized strip of rubber through a funnel-shaped guide, whereby the rubber is caused to surround the wire, applying, by means of a braiding-machine, a braided fibrous covering upon the rubber as the wire emerges from the said funnel-shaped guide, and passing the wire thus covered from said guide to compression-rollers, between which it is pressed to cause the adherence together of the edges of the rubber and the partial embedding of the braided covering in the rubber surface, essentially as set forth.

In testimony whereof I affix my signature in presence of two witnesses.

WILLIAM H. SAWYER.

Witnesses:
 GILMAN E. JOPP,
 SANFORD C. HONY.